United States Patent [19]

Moon et al.

[11] Patent Number: 4,527,040

[45] Date of Patent: Jul. 2, 1985

[54] METHOD OF LASER WELDING

[75] Inventors: Deug W. Moon; Edward A. Metzbower, both of Alexandria, Va.

[73] Assignee: The United States of America as represented by the Secretary of the Navy, Washington, D.C.

[21] Appl. No.: 504,994

[22] Filed: Jun. 16, 1983

[51] Int. Cl.$^3$ .............................................. B23K 27/00
[52] U.S. Cl. ............................ 219/121 LD; 219/118
[58] Field of Search ................ 219/121 LC, 121 LD, 219/121 EC, 118, 517, 101, 106

[56] References Cited

U.S. PATENT DOCUMENTS

| | | | |
|---|---|---|---|
| 3,303,319 | 2/1967 | Steigerwald | 219/121 ED |
| 3,463,898 | 8/1969 | Takaoka et al. | 219/121 LC |
| 3,560,700 | 2/1971 | Reidelsturz et al. | 219/121 ED |
| 3,585,350 | 6/1971 | Voytko | 219/121 LC |
| 3,808,395 | 4/1974 | Bailey et al. | 219/121 ED |
| 3,949,186 | 4/1976 | Nakayama et al. | 219/121 EM |
| 3,975,612 | 8/1976 | Nakazaki et al. | 219/118 X |
| 4,001,543 | 1/1977 | Bove et al. | 219/121 L |
| 4,063,062 | 12/1977 | Kuhnen | 219/121 ED |
| 4,080,525 | 3/1978 | Gobetz | 219/121 L |
| 4,152,573 | 5/1979 | Saurin | 219/121 L |
| 4,219,720 | 9/1980 | Moench | 219/121 EM |
| 4,341,942 | 7/1982 | Chaudhari et al. | 219/121 LC X |

OTHER PUBLICATIONS

The Application of Electron Beam Welding–Part 2, Source Book on Electron Beam and Laser Welding, 1981, Terai et al.

Primary Examiner—C. L. Albritton
Attorney, Agent, or Firm—Robert F. Beers; William T. Ellis; Alan P. Klein

[57] ABSTRACT

A method of welding two HY-steel members to produce a weld joint having improved impact toughness. The surface to be welded are first machined, roto-blasted and cleaned with acetone. Then, an insert of Inconel 600 is provided and cleaned with acetone. Next, the Inconel 600 insert is introduced between the surfaces to be welded and the HY-steel members are butted against the insert. Then, a laser welding beam is applied to the Inconel 600 insert to weld together the assembly of steel members and insert.

15 Claims, 2 Drawing Figures

METHOD OF LASER WELDING

BACKGROUND OF THE INVENTION

This invention relates to welding methods, and more particularly to laser welding methods.

High power lasers have been used since the early 1970's to weld thick structural materials including the HY-steels. Investigators have reported both the excellent properties and the advantages of laser welding. No experimenters, however, are known to have successfully fabricated laser weldments which meet the Navy's impact fracture toughness criteria, particularly at low temperatures. In order for high strength steels to be used in submarines and deep submersible vessels which reach great depths and travel in the Arctic Ocean, these criteria must be met.

Heretofore, heat treatment and application of filler wires of similar composition to the base plate have been used to improve the toughness of laser beam weldments.

SUMMARY OF THE INVENTION

It is therefore an object of this invention to fabricate laser weldments.

Another object is to produce a laser beam weld joint having improved impact toughness.

These and other objects of the present invention are achieved by a method of welding two members, wherein an inoculant of dissimilar composition to the two members is introduced between the surfaces to be welded of the two members and the surfaces are butted against the inoculant. Then, a laser beam is applied to the inoculant to weld together the assembly of member and inoculant. In a preferred embodiment, the two members are formed from the same HY-steel and the inoculant is an insert of Inconel Ni-Cr-Fe alloy 600.

Among the advantages of the inventive method are the resulting improvement in the toughness of HY-steel laser welds over a temperature range from room temperature down to $-50°$ C., its ease of application and low cost, and the fact that no heat treatment is required before and after welding.

Additional advantages and features will become apparent as the subject invention becomes better understood by reference to the following detailed description when considered in conjunction with the accompanying drawings wherein:

DESCRIPTION OF THE PREFERRED EMBODIMENTS

Figure 1:
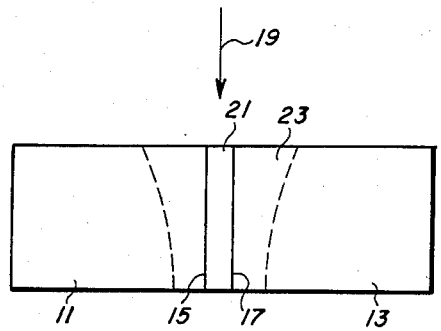
FIG. 1 is a diagram showing the application of a laser beam to members to be joined in accordance with the principles of the invention.

Referring to FIG. 1, reference numerals 11 and 13 designate two high strength steel members. The surfaces of these two members which are to be welded have been previously prepared by machining, rotoblasting and cleaning with acetone. The end 15 of one member 11 is brought in line with the end 17 of the other member 13. Arrow 19 symbolizes a laser beam. According to the process of the invention, an Inconel 600 insert 21, previously prepared by cleaning with acetone, is placed between the ends 15 and 17 of the two members in the area 23 whose fusion is brought about by the laser beam 19.

The joint obtained in this way between the two steel members makes it possible to obtain a sound joint with excellent fracture toughness from room temperature down to $-50°$ C. It is therefore possible to use it for the hulls of submarines and deep submersible rescue vessels.

EXAMPLE I

As an example, the joint between a pair of HY-80 steel plates was produced by the process according to the invention.

Using a 15 kW, continuous wave, $CO_2$ laser, HY-80 steel plates of 12 mm (0.5 inch) thickness were square butt welded both with and without an Inconel 600 sheet. The thickness of the Inconel 600 sheet was 0.12 mm ($5 \times 10^{-3}$ inch) thickness. The compositions of the steel and Inconel 600 are shown in Table 1. The welding conditions are summarized in Table 2.

TABLE 1

| Materials | Compositions, wt % Element | | | | | | | | | | | | | |
|---|---|---|---|---|---|---|---|---|---|---|---|---|---|---|
| | Ni | Cr | C | Mn | Si | Mo | Cu | Al | V | Ti | Sn | S | P | Fe |
| HY-80 | 2.40 | 1.63 | 0.17 | .31 | 0.24 | 0.38 | 0.04 | 0.016 | 0.005 | 0.002 | 0.003 | 0.016 | 0.01 | BAL |
| Inconel 600 | 75.68 | 15.14 | 0.02 | 0.22 | 0.18 | | 0.14 | | | | | 0.002 | | 8.62 |

TABLE 2

| WELDING CONDITIONS | |
|---|---|
| LASER POWER: | 12 kW |
| TRAVEL SPEED: | 1.27 cm/sec (30 ipm) |
| HEAT INPUT: | 0.94 kJ/mm (24.0 kJ/in) |
| SHIELDING GAS | (helium) |
| PRESSURE: | PLASMA - 60 CFH |
| | LEAD - 30 CFH |
| | TRAIL - 30 CFH |
| | BOTTOM - 30 CFH |

Pure helium gas was used to protect the reactive, hot weld and to control the plasma formed during laser welding action. All the weldments were given visual and radiographic examinations.

The microstructures of the laser beam weldments, with and without the Inconel 600 inserts, were determined by conventional metallographic techniques. The microhardness of the weldment was measured by using a diamond pyramid indenter. Compositional changes in the different zones of the weldment were determined using an electron beam microprobe. The energy absorbed by the weldment as a function of temperature was determined by the Charpy V-notch test and the dynamic tear test.

TEST RESULTS

Metallography. In order to examine the soundness of bonding and mixing behavior between the inoculant and the parent metal the microstructures of the fusion boundaries were closely inspected. Thorough metallographic examinations along the fusion boundaries revealed both an apparent fusion line and the true fusion line. No signs of cracks, porosities and other type of defects were found along the fusion boundaries of the solidification structure of the HY-80 laser beam weldment with the Inconel 600 insert. The fusion zone microstructure of the autogenous weld comprised untempered martensite with some bainite. The microstructure of the weld with the Inconel 600 insert was comprised of martensite with some bainite. The fusion zone structure of the heterogeneous weld was a very refined structure in contrast with that of the autogenous welds.

Electron Beam Microprobe Analysis. Chemically different base metal and Inconel 600 insert will mix each other during welding. This mixing behavior can be examined by studying the redistributed alloying elements of both materials after welding. Thus a point mode scan was performed across the fusion boundaries. The concentrations of Ni and Cr increased gradually from the base metal values of 2.3 and 0.8 wt % to the fusion zone values of 6.4 and 1.4 wt %. The scan from one side of the base metal, across the fusion zone to the other side of the base metal revealed that the compositions of the other alloying elements (Mo, Mn, Si and Cu) remained unchanged throughout the base metal, the heat-affected zone (HAZ) and the fusion zone.

Microhardness. Microhardness traverses were taken across HAZ and fusion zones. In the autogenous weld the average hardness value of the fusion zone was 45 $R_c$ and the hardnesses of the HAZ varied from 25 $R_c$ to 46 $R_c$. In the heterogeneous weld the average fusion zone hardness was 45 $R_c$ and the HAZ hardnesses were from 25 $R_c$ to 46 $R_c$. There was no difference in hardness between the autogenous weld and the heterogeneous weld. The extremely high hardness values of the HAZ and the fusion zones are characteristic of laser beam welded ferrous alloys at similar carbon levels. This is a result of the fast cooling rate inherent in the laser welding process.

Figure 2:
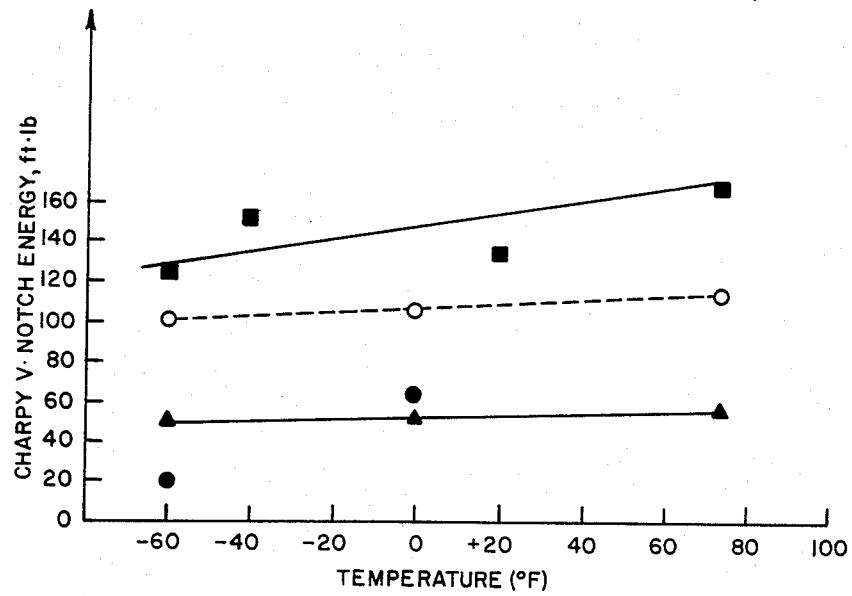
FIG. 2 is a graph of Charpy V-notch impact energies of the laser beam weldments and the base metal as a function of energy.

Impact Toughness. Weld and base metal Charpy V-notch (CVN) impact specimens were tested at three temperatures: 25° C.(77° F.), −17.8° C.(0° F.) and −51.1° C.(−60° F.). Dynamic tear (DT) tests were also conducted at −1° C.(30° F.) and −29° C. (−20° F.). CVN impact energies of the laser beam weldments and the base metal as a function of temperature are shown in FIG. 2. The Navy's requirements are also shown for comparison.

The fracture initiated in the fusion zone and then swiftly directed into the base plate at all temperatures.

The energies absorbed by the weldments were substantially higher than the required values. The average energy of the HY-80/Inconel 600 insert welds was 162.8J (120 ft-lb) at −50° C.(−60° F.) and 176J (130 ft-lb) at −18° C.(0° F.). The corresponding required values are 27.1J (20 ft-lb) at −50° C.(−60° F.) and 81.4J (60 ft-lb) at −18° C.(0° F.). The CVN energies of the weldments were also superior to that of base plate: the base metal values in the direction of L-T and T-L are 135.6J (100 ft-lb) and 67.8J (50 ft-lb) at −50° C.(−60° F.) and 141.1J (104 ft-lb) and 73.2J (54 ft-lb) at −18° C.(0° F.). The room temperature toughness of the welds is also higher than the base plate value. The average DT energies of HY-80 welds with Inconel 600 insert were 610.5J (450 ft-lb) at −1° C.(30° F.) and 530.5J (391 ft-lb) at −29° C.(−20° F.). The requirements are 576.6J (425 ft-lb) at −1° C.(30° F.) and 339.2J (250 ft-lb) at 29° C.(−20° F.).

EXAMPLE II

A pair of HY-100 steel plates were welded by the process according to the invention.

Using a 15 kW, continuous wave, $CO_2$ laser, HY-100 steel plates of 12 mm (0.5 inch) thickness were square butt welded both with and without an Inconel 600 sheet. The thickness of the Inconel 600 sheet was 0.12 mm ($5 \times 10^{-3}$ inch) thickness. The compositions of the steel and Inconel 600 are shown in Table 3. The welding conditions are summarized in Table 4.

TABLE 3

| Materials | Compositions, wt % Element | | | | | | | | | | | | |
|---|---|---|---|---|---|---|---|---|---|---|---|---|---|
| | Ni | Cr | C | Mn | Si | Mo | Cu | Al | V | Ti | Sn | S | P | Fe |
| HY-100 | 2.89 | 1.60 | 0.15 | 0.30 | 0.26 | 0.30 | 0.15 | | 0.003 | 0.003 | | 0.011 | 0.005 | BAL |
| Inconel 600 | 75.68 | 15.14 | 0.02 | 0.22 | 0.18 | | 0.14 | | | | | 0.002 | | 8.62 |

TABLE 4

| WELDING CONDITIONS | |
|---|---|
| Laser Power: | 12 kW |
| Travel Speed: | 1.27 cm/sec (30 ipa) |
| Heat Input: | 0.94 kJ/mm (24.0 kJ/in) |
| Shielding Gas | (helium) |
| Pressure: | Plasma - 60 CFH |
| | Lead - 30 CFH |
| | Trail - 30 CFH |
| | Bottom - 30 CFH |

Pure helium gas was used to protect the reactive, hot weld and to control the plasma formed during laser welding action. All the weldments were gives visual and radiographic examinations.

The microstructures of the laser beam weldments, with and without the Inconel 600 inserts, were determined by conventional metallographic techniques. The microhardness of the weldment was measured by using a diamond pyramid indenter. Compositional changes in the different zones of the weldment were determined using an electron beam microprobe. The energy absorbed by the weldment as a function of temperature was determined by the Charpy V-notch test and the dynamic tear test.

TEST RESULTS

Metallography. Extensive studies on the fusion boundaries were made to examine the bonding and the mixing behavior between the parent metal (HY-100) and the insert (Inconel 600). No signs of incomplete fusion, cracks, porosities were observed along the fusion boundaries.

The base plate microstructure was comprised of quenched and tempered martensite. The microstructure of the autogenous laser weld consisted of untempered martensite with some bainite. The fusion zone microstructure of the heterogeneous weld was martensite with some bainite. The fusion zone microstructure of the weld with Inconel insert was refined contrasting to the coarse and directional structure of the autogenous weld.

Electron Beam Microprobe Analysis. The mixing behavior of Inconel 600 with the base metal was examined by an electron microprobe scan across the fusion boundaries. Measured concentrations of Ni and Cr with base metal were 1.8 and 1.6 wt %. These values begain to increase gradually at the true fusion line and reached the fusion zone values of 5.9 and 2.4 wt % at the apparent fusion line. These concentrations remained constant throughout the fusion zone.

All other alloying elements (Mo, Mn, Si and Cu) did not show compositional changes over the regions of base, HAZ and fusion zone.

Hardness. Microhardness traverses across the HAZ and the fusion zone were made. The fusion zone hardness is approximately 47 $R_c$ for the autogenous weld and 44 $R_c$ for the weld with Inconel 600 insert. The HAZ hardness values ranged from 47 $R_c$ to 29 $R_c$ for the autogenous weld and from 44 $R_c$ to 27 $R_c$ for the heterogeneous weld. The hardness in the fusion zone and the HAZ of the heterogeneous weld was higher than that of the autogenous weld by approximately 3 $R_c$.

Impact Toughness. Dynamic tear (DT) test specimens of HY-100 laser welds with Inconel 600 insert were tested at $-1°$ C.(30° F.) and $-29°$ C.($-20°$ F.) DT energies of the weldments were 873.8J (644 ft-lb) at $-1°$ C.(30° F.) and 674.3J (497 ft-lb) at $-29°$ C.($-20°$ F.). The corresponding required values are 576.6J (425 ft-lb) at $-1°$ C.(30° F.) and 339.2J (250 ft-lb) at $-29°$ C.($-20°$ F.). All the DT values for weldments met the required values.

It is obvious that many modifications and variations of the present invention are possible in light of the above teachings. It is therefore to be understood that within the scope of the appended claims, the invention may be practiced otherwise than as described.

What is claimed as new and desired to be secured by Letters Patent of the United States is:

1. A method of welding two structural steel members to produce a weld joint having improved impact toughness comprising the step of:
   (a) introducing an inoculant comprising an insert of Inconel 600 in the range of 0.005 inch in thickness between the surfaces of the two steel members to be welded ranging in composition from HY-80 to HY-100 steel;
   (b) butting the surfaces to be welded of the two members against the inoculant; and
   (c) applying a laser beam to the inoculant to weld together the assembly of members and inoculant.

2. A method of welding two steel members to produce a weld joint having improved impact toughness comprising the steps of:
   (a) roto-blasting the surfaces to be welded of the two steel members;
   (b) cleaning the surfaces to be welded of the two steel members;
   (c) introducing an inoculant comprising an insert of Inconel 600 between the surfaces to be welded of the two members;
   (d) butting the surfaces to be welded of the two members against the inoculant; and
   (e) applying a laser beam to the inoculant to weld together the assembly of members and inoculant.

3. The method recited in claim 2 including the step of:
   machining the surfaces to be welded of the two steel members prior to the roto-blasting step.

4. The method recited in claim 3 including the step of:
   cleaning the insert prior to the step of introducing it between the surfaces to be welded of the two members.

5. The welded assembly produced by the method recited in claim 1.

6. A method of welding two steel members to produce a weld joint having improved impact toughness, comprising the steps of:
   (a) machining the surfaces to be welded of the two steel members;
   (b) roto-blasting the surfaces to be welded of the two steel members;
   (c) cleaning the surfaces to be welded of the two steel members;
   (d) providing an insert of Inconel 600;
   (e) cleaning the Inconel 600 insert;
   (f) introducing the Inconel 600 insert between the surfaces to be welded of the two steel members;
   (g) butting the surfaces to be welded of the two steel members against the insert; and
   (h) applying a laser welding beam to the insert to weld together the assembly of steel members and insert.

7. The method recited in claim 6 wherein:
   step (b) is accomplished with a carbon-dioxide laser.

8. The method recited in claim 7 wherein step (h) includes the step of:
   protecting the weld with helium gas.

9. The method recited in claim 8 wherein:
   the steel is HY-80 steel.

10. The method recited in claim 8 wherein:
    the steel is HY-100 steel.

11. The welded assembly produced by the method recited in claim 4.

12. A method of welding two HY- steel members to produce a weld joint having improved impact toughness, comprising the steps of:
    (a) machining the surfaces to be welded of the two HY- steel members;
    (b) roto-blasting the surfaces to be welded of the two HY- steel members;
    (c) cleaning the surfaces to be welded of the two HY- steel members;
    (d) providing an insert of Inconel 600;
    (e) cleaning the Inconel 600 insert;
    (f) introducing the Inconel 600 insert between the surfaces to be welded of the two HY- steel members;
    (g) butting the surfaces to be welded of the two HY- steel members against the insert; and
    (h) applying a continuous wave, carbon-dioxide laser welding beam to the insert to weld together the assembly of HY- steel members and insert;
    wherein step (h) includes protecting the weld with helium gas.

13. The method recited in claim 12 wherein:
    the surfaces to be welded are cleaned with acetone in step (c).

14. The method recited in claim 13 wherein:
    the Inconel 600 insert is cleaned with acetone in step (e).

15. The welded assembly produced by the method recited in claim 12.

* * * * *